March 22, 1949.    H. B. BABSON    2,464,917
VALVE
Filed Dec. 13, 1944    2 Sheets-Sheet 1
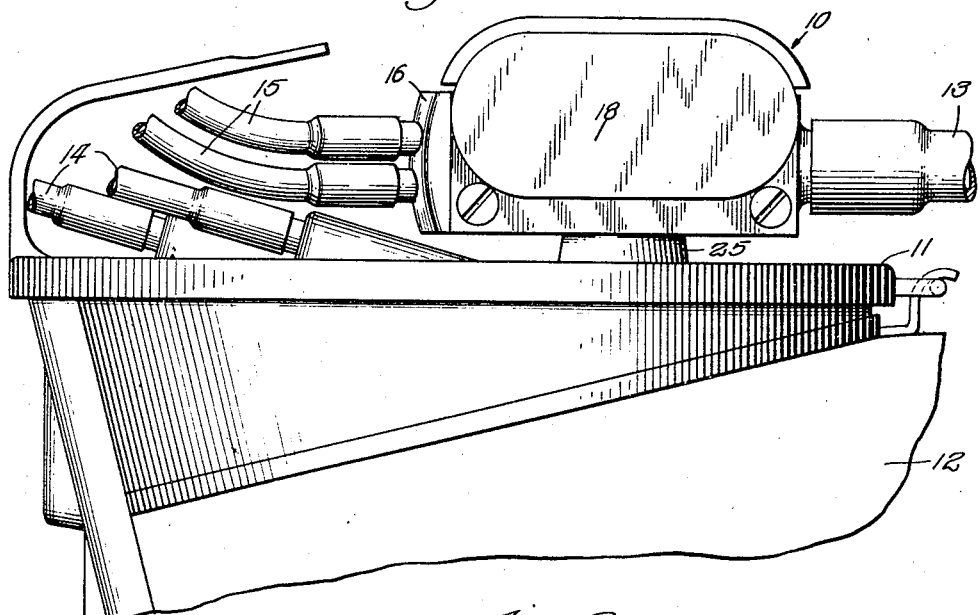
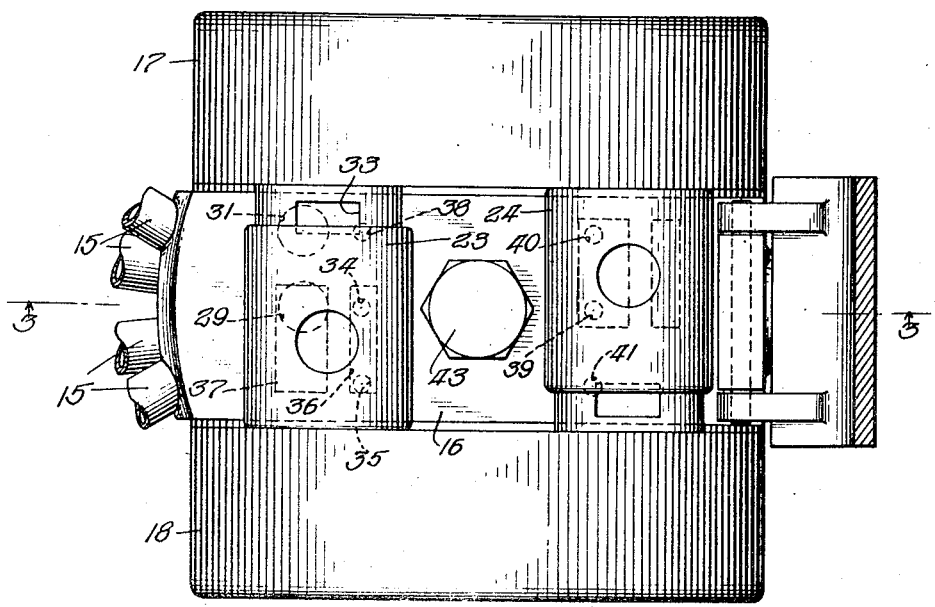
Inventor:
Henry B. Babson,
By Chritton, Wiles, Schroeder,
Merriam & Hofgren, Attys.

March 22, 1949.                H. B. BABSON                2,464,917
                                  VALVE
Filed Dec. 13, 1944                                    2 Sheets-Sheet 2
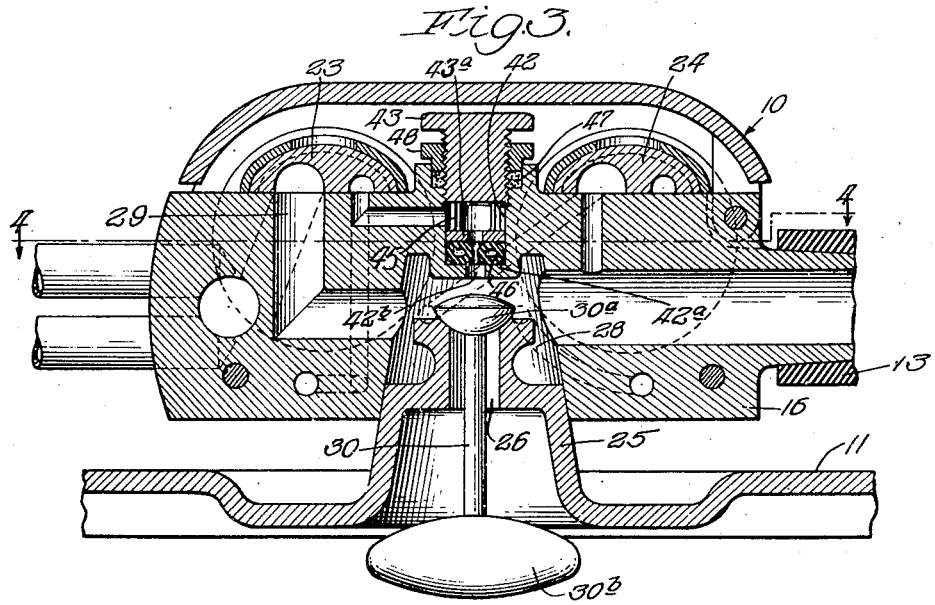
Inventor:
Henry B. Babson,
By Chitton, Wiles, Schroeder,
Merriam & Hyers, Attys.

Patented Mar. 22, 1949

2,464,917

UNITED STATES PATENT OFFICE 2,464,917

VALVE

Henry B. Babson, Chicago, Ill., assignor to Babson Bros. Co., a corporation of Illinois Application December 13, 1944, Serial No. 567,957

1 Claim. (Cl. 138—45)

This invention relates to a valve, and more particularly to a control valve for regulating the operation of a milking machine pulsator.

One feature of this invention is that it provides a new and improved control arrangement for regulating fluid flow in a pneumatically operated device where the operating flow of air is small; another feature of this invention is that it provides a flow regulating valve, for use in situations where the regulated orifice is quite small, which minimizes likelihood of clogging up due to the presence of dust or other solid particles in the stream of air passing therethrough; and yet another feature of this invention is that it provides a very efficient and clearly improved regulating valve for a milking machine pulsator of the pneumatically operated type. Other features and advantages of this invention will be apparent from the specification and the drawings, in which:

Figure 1 is a fragmentary side elevational view of a pusator embodying my invention, and part of the milking machine with which it is associated; Figure 2 is a plan view of the pulsator shown in Figure 1, with the cover open; Figure 3 is a vertical sectional view through the pulsator and the associated portion of the milker pail cover, along the line 3—3 of Figure 2; and Figure 4 is a horizontal sectional view along the line 4—4 of Figure 3.

Milking machines of the type commercially used for the past two or three decades have all been of what is known as the double acting type, applying a steady vacuum in the milk tubes and vacuum alternating with atmospheric pressure in the space between the teat-cup shells and the rubber inflations around the teats. In order to provide this pulsating vacuum there must be some apparatus for alternately connecting the teat-cup shells to the source of vacuum, and then disconnecting them from the vacuum and opening them to atmosphere. This is conventionally accomplished by a device known as a pulsator which includes valve means for effecting the desired connections with the teat-cups, and further valve means for causing the main valve device to be pneumatically operated.

In order to enable variation in the pulsator rate, and thus in the rate at which the inflation is expanded and contracted around the teat, some control means must be provided regulating the flow of air to the pneumatic mechanism which moves the principal valves. It has been found preferable to run the pulsator at a rate in the neighborhood of fifty cycles of operations per minute, but since it may be desirable to increase or decrease this rate slightly with different cows, and since the condition of the pulsator parts may require more or less vacuum power to achieve the desired rate, the control must be readily changeable in the field during use of the milking apparatus. Heretofore, control of the pulsator rate has been accomplished by a conventional needle valve, but this has been found to have several disadvantages. The principal disadvantage is that, in the needle valve arrangement, a pointed member moves in and out of its cooperating opening, and the flow of air is through an annular orifice around the pointed valve member. Where only a very small flow of air is desired, as in the case of a milking machine pulsator, the annular opening has a width of only a few thousandths of an inch. The milking machine is normally used in an atmosphere containing a great deal of foreign matter such as lint, dust, bits of straw and the like, and these choke up and block off portions of the small annular orifice, so that frequently a pulsator of conventional type will change its rate considerably during the milking operation. A pulsator started running in a barn at night and left running has frequently been found completely stopped in the morning. Another objection to the present conventional needle valve is that the vibration of the parts during milking frequently causes the adjusting stud to work in or out slightly, which also obviously results in undesirable changes in the rate of operation of the pulsator.

I have overcome these and other objections to the needle valve control arrangements now conventionally used with milking machine pulsators, and have provided a control which enables variation of the effective opening while maintaining the effective opening concentrated in one area; which retains its adjustment; and which is readily operable by the farmer. I accomplish this by use of a resilient member having the flow passage to be controlled extending therethrough; and by placing this resilient member between two rigid members in such manner that movement of one of the members toward or away from the other rigid member varies the compression on the intermediate resilient member, and thus varies the cross-sectional area or orifice size of at least a portion of the flow passage therethrough. More particularly, I preferably employ one rigid member having a cylindrical well with an internal annular shoulder; a doughnut-shaped rubber member resting on this annular shoulder; and another rigid member arranged to move toward and away from said shoulder to vary the compression on the doughnut-shaped member of resilient material, and thus to vary the size of the flow control opening through the center thereof.

In order to better bring out the way in which my control arrangement operates, and the parts with which it is associated, I will first briefly describe the pulsator in its entirety, although it is to be understood that such pulsators have been on the market for many years with the conventional needle valve type of control, so that no claim is being made other than to the control portion itself. The arrangement of the vacuum passageways and the operation of such a pulsator have been fully illustrated and described in Fosler Patent No. 1,376,804, which issued May 3, 1921, and will therefore be only briefly described here.

In the particular embodiment of my invention illustrated herewith a pulsator identified in general as 10 is shown mounted on the cover 11 of the pail 12 of a milking machine of the suspended type. A full description of such milking machines may be had by reference to McCornack Patent 1,859,213, which issued May 17, 1932. For the purposes of the description of this invention it will be sufficient to state that the tube 13 is connected to some source of steady vacuum, usually through a stall cock and pipe line; that this vacuum is communicated to the interior of the pail 12, and thus to the milk tubes 14; and that, by means of the pulsator mechanism which will be more fully described, the tubes 15 leading to the teat-cups and opening into the shells to the outside of the inflations, alternately have vacuum drawn therein and atmospheric pressure therein.

Turning now more particularly to Figures 2–4, it will be seen that the pulsator comprises as its principal body parts a central block 16 and a pair of side portions 17 and 18. As may be best seen in Figure 4, these side portions provide cylinders for pistons 19, 20, 21 and 22, which operate in pairs, the pistons 19 and 20 being connected by the slide member 23 and the pistons 21 and 22 being connected by the slide member 24. These same slide members have slots on their under surfaces which cooperate with openings in the central block 16 to provide certain valve operations to be hereafter more fully described.

As may be best seen in Figure 3, the pulsator is removably supported on an upstanding portion 25 of the lid 11, this portion having a central opening 26 communicating with a chamber 28 forming part of the passageway between the vacuum hose 13 and the passageway 29. A check valve 30, having an upper valve member portion 30a and a lower weight portion 30b is associated with the opening 26 and serves to keep the bucket evacuated at a slightly lower level of vacuum than that existing in the hose 13, and thus in the chamber 28. In the position in which the slide member 23 is shown in the figures, the passageway 31, which communicates with the metal nipples 32 on which the tubes 15 are mounted, is opened to atmosphere through the rectangular opening 33; and at the same time the vacuum port 34 is connected to the vacuum port 35 by the slot 36 in the lower face of the slide 23. When vacuum has caused the slide member 23 to move to the other limit of its travel (through operation on the piston 19), however, the passageway 31 is connected to the passageway 29 by the rectangular slot 37, so that a vacuum is drawn in the teat-cup shells. It will be apparent that as the slide member 23 moves back and forth, as vacuum is drawn behind the piston 19 and then behind the piston 20, the teat-cup shells will first be evacuated and then opened to atmosphere to give the desired periodic pressure and release on the teats. Connection of the vacuum port 34 to the port 35 at one limit of movement, and to the port 38 at the other limit of movement, admits vacuum to one side or the other of the pistons associated with the slide member 24, so that this assembly comprising the pistons 21 and 22 and the slide member 24 moves back and forth; and it is this slide which controls the movement of the first-described slide member by causing the vacuum port 39 to be connected at one time with the port 40, and at another time with the port 41. The vacuum port 39 opens directly into the vacuum passageway leading from the hose 13, so that the slide member 23 is moved to one side or the other with considerable rapidity whenever connection is made to the port 40 or the port 41. The flow of air through the vacuum port 34, however, is controlled so that the slide member 24 can be caused to move at any rate desired. It is by means of this control arrangement that the pulsator rate of operation can be determined and adjusted, and it is to a valve for controlling this flow that my invention is particularly directed.

In the middle of the central block 16 is a cylindrical opening 42 threaded at its upper end to receive an adjusting member 43. The cylindrical portion is provided with an annular metal shoulder 42a surrounding an opening 42b communicating with the vacuum chamber 28. The vacuum port 34 terminates in an opening 45 in one wall of the cylindrical portion 42 of the block. Resting on the annular shoulder 42a is a doughnut-shaped member 46 of resilient material, as rubber, the dimensions of this member being such that in its unstressed condition its outer diameter is substantially the same as the inner diameter of the cylindrical portion in which it is received, and the central opening through the member has a minimum diameter of 20–25 thousandths of an inch. In order that the doughnut-shaped member may be more readily deformed under pressure it preferably has a small central opening providing an annular chamber concentric with the opening through the member as may be best seen in Figure 3. The adjusting member 43 has a bottom washer portion 43a adapted to press on the upper surface of the doughnut-shaped member, the washer portion being separated from the main body of the adjustable member by legs, or a spider support, as it is sometimes called. The use of a spider support provides full and free opening for the movement of air out of the port 45, through the legs of the spider support, down through the center of the washer portion 43a and the resilient member 46, and through the opening 42b to the vacuum chamber and thus to the source of vacuum. Associated with the adjustable member is a sealing arrangement comprising a packing 47 and a gland nut 48.

When the machine is in operation adjustment of the rate of pulsator operation may be effected through rotation of the adjustment member 43 and thus variation of the compression of the resilient member 46 between the two rigid members above and beneath it. Screwing down the adjustment member 43 serves to reduce the rate of operation of the pulsator by constricting the central opening through the doughnut shaped member, whereas movement of the adjustment member 43 in the opposite direction serves to permit release of the compression on the resilient member and increase of the pulsator rate. The sealing arrangement not only serves to prevent loss of vacuum around the adjustment member but also as a locking means holding the adjustment member to a position to which it has been set. Preferably, of course, the gland nut 48 would be loosened slightly before movement of the adjustment member 43, and then retightened afterward to hold the adjustment.

It will be readily apparent that I have provided control apparatus for readily and completely controlling the rate of flow of air which operates the pulsator, and which at the same time concentrates the effective opening area, during such variation, to prevent clogging by fine particles of solid material in the air flowing through the pulsator. That is, whether the desired rate requires an effective opening of 15 thousandths of an inch in diameter or 25 thousandths of an inch in diameter, the area through which the air moves is always concentrated in a single opening so that it can be clogged only by particles of material of greater diameter; and it is unusual for particles this large to get into the pulsator mechanism. The difficulty has been with particles of only 3 or 4 thousandths of an inch diameter piling up in the annular orifice of a needle valve and gradually reducing the effective area thereof.

While I have shown and described certain embodiments of my invention, it is to be understood that it is capable of many modifications. Changes, therefore, in the construction and arrangement may be made without departing from the spirit and scope of the invention as disclosed in the appended claim.

I claim:

In a milking machine pulsator of the pneumatically operated type, control apparatus for regulating the operation thereof, including: a member of rigid material; a member of resilient material having a flow passage therein, said resilient member being provided with a small annular chamber concentric with the flow passage; and means for compressing said resilient material to vary the cross-sectional area of at least a portion of said flow passageway.

HENRY B. BABSON.

REFERENCES CITED

The following references are of record in the file of this patent:

UNITED STATES PATENTS

| Number | Name | Date |
|---|---|---|
| 6,974 | Moat | Dec. 25, 1849 |
| 2,025,247 | Rosenberger | Dec. 24, 1935 |
| 2,163,007 | O'Dell | June 20, 1939 |
| 2,238,709 | Schraig | Apr. 15, 1941 |
| 2,319,498 | Gerard | May 8, 1943 |